(12) United States Patent
Weppner et al.

(10) Patent No.: US 8,092,941 B2
(45) Date of Patent: Jan. 10, 2012

(54) CHEMICALLY STABLE SOLID LITHIUM ION CONDUCTOR

(75) Inventors: Werner Weppner, Heikendorf (DE); Venkataraman Thangadurai, Kiel (DE)

(73) Assignee: Werner Weppner, Heikendorf (DE)

( * ) Notice: Subject to any disclaimer, the term of this patent is extended or adjusted under 35 U.S.C. 154(b) by 0 days.

(21) Appl. No.: 13/007,773

(22) Filed: Jan. 17, 2011

(65) Prior Publication Data
US 2011/0133136 A1 Jun. 9, 2011

Related U.S. Application Data

(62) Division of application No. 10/591,714, filed as application No. PCT/EP2005/002255 on Mar. 3, 2005, now Pat. No. 7,901,658.

(30) Foreign Application Priority Data

Mar. 6, 2004 (DE) .................. 10 2004 010 892
Jan. 27, 2005 (WO) ............... PCT/EP2005/000809

(51) Int. Cl.
*H01M 10/0562* (2010.01)
*H01M 8/10* (2006.01)
*H01G 9/025* (2006.01)
*G01N 27/333* (2006.01)

(52) U.S. Cl. ......... 429/322; 429/495; 361/525; 204/421
(58) Field of Classification Search .................. None
See application file for complete search history.

(56) References Cited

OTHER PUBLICATIONS

D. Mazza, "Remarks on a Ternary Phase in the La2O3-Me2O5-Li2O System (Me=Nb,Ta)", Materials Letters, vol. 7, No. 5.6, Nov. 1998, pp. 205-207.
Thangadurai et al., "Crystal Structure Revision and Identification of Li+-Ion Migration Pathways in the Garnet-like Li5La3M2O12 (M=Nb, Ta) Oxides", Chem. Mater., 2004, 16, pp. 2998-3006.
Thangadurai et al., "Investigations on electrical conductivity and chemical compatibility between fast lithium ion conducting garnet-like Li6BaLa2Ta2O12 and lithium battery cathodes", Journal of Power Sources, vol. 142, No. 1-2, Mar. 24, 2005, pp. 339-344.
Thangadurai et al., "Novel Fast Lithium Ion Conduction in Garnet-Type Li5La3M2O12 (M=Nb,Ta)", J. Am. Ceram. Soc., 86[3] pp. 437-440 (2003).

*Primary Examiner* — Jonathan Crepeau
(74) *Attorney, Agent, or Firm* — Rothwell, Figg, Ernst & Manbeck, P.C.

(57) ABSTRACT

The present invention concerns chemically stable solid lithium ion conductors, processes for their production and their use in batteries, accumulators, supercaps and electrochromic devices.

11 Claims, 3 Drawing Sheets

CHEMICALLY STABLE SOLID LITHIUM ION CONDUCTOR

This application is divisional of application Ser. No. 10/591,714 filed Sep. 6, 2006, now U.S. Pat. No. 7,901,658, which is a 35 U.S.C. 371 National Phase Entry Application from PCT/EP2005/002255, filed Mar. 3, 2005, which claims the benefit of German Patent Application No. 10 2004 010 892.7 filed on Mar. 6, 2004, the disclosure of which is incorporated herein in its entirety by reference.

The present invention concerns chemically stable solid ion conductors in particular lithium ion conductors, processes for their production and their use in batteries, accumulators and electrochromic devices.

Mobile energy stores with high energy densities (and high power densities) are required for numerous technical devices, above all for mobile telephones and portable computers (e.g. notebooks). In this connection rechargeable chemical energy stores, especially secondary batteries and super-capacitors are of supreme importance.

The previous highest energy densities in the range of 0.2 to 0.4 Wh/cm$^3$ are nowadays commercially achieved with so-called lithium ion batteries. These usually consist of a liquid organic solvent (e.g. EC/DEC) containing a lithium salt (e.g. LiPF$_6$), an anode made of graphite with intercalated lithium and a cathode made of lithium cobalt oxide where the cobalt may be partially or completely replaced by nickel or manganese.

It is generally known that the service life of such lithium ion batteries is quite limited and hence they often have to be replaced even during the lifetime of the device to be supplied. Moreover, it is generally expensive to get replacements and disposal of the old batteries is problematic since some of the ingredients are not environmentally friendly.

In operation the batteries of the prior art prove to be not sufficiently powerful for many applications (e.g. offline operation of a notebook for a maximum of a few hours). The batteries are chemically unstable when electrodes are used that enable higher voltages of for example 5 V or more; the organic electrolyte components start to decompose at voltages above 2.5 V. The liquid electrolyte is in any case a safety hazard: in addition to the risk of leakage, fire and explosion, the growth of dendrites is also possible which can result in a high self-discharge and heating.

Liquid electrolyte batteries are basically unsuitable for some technical objectives because they must always have a minimum thickness and thus can only be used to a limited extent as thin energy stores e.g. on chip cards.

Solid lithium ion conductors such as $Li_{2.9}PO_{3.3}N_{0.46}$ ($Li_{3-x}PO_{4-y}N_y$, LIPON) are also known and have been used on a laboratory scale in thin layer batteries. However, these materials generally have a considerably lower lithium conductivity than liquid electrolytes. Solid lithium ion conductors having the best ion conductivities are $Li_3N$ and Li-β-alumina. Both compounds are very sensitive towards water (moisture). $Li_3N$ already decomposes at a voltage of 0.445 V at room temperature; Li-β-alumina is chemically unstable.

Lithium ion conductors having a garnet-like structure were presented in the paper "Novel fast lithium ion conduction in garnet-type $Li_5La_3M_2O_{12}$ (M=Nb, Ta)" by Thangadurai et al. (J. Am. Ceram. Soc. 86, 437-440, 2003).

Garnets are orthosilicates of the general composition $A_3B_2(SiO_4)_3$ in which A and B represent eight-coordinate or six-coordinate cation positions. The individual $SiO_4$ tetrahedrons are connected together by ionic bonds with the interstitial B cations. The compounds of the formula $Li_5La_3M_2O_{12}$ (M=Nb, Ta) have a garnet-like structure. They crystallize in a cubic symmetry with the lattice constant a=12.797 Å or 12.804 Å respectively for the corresponding compound in which M=Nb or Ta. Compared with the ideal garnet structure there is an excess of 16 lithium ions per formula unit. The $La^{3+}$ and $M^{5+}$ ions occupy the eight-coordinate or six-coordinate positions whereas lithium ions occupy positions having a six-fold coordination. The similarity between the ideal garnet structure and $Li_5La_3M_2O_{12}$ is due to the fact that alkaline/rare earth metal ions occupy the dodecahedral (eight-) coordinate positions and M atoms occupy the six-coordinate positions. The main difference in the structures is due to the fact that Si occupies the position with the four-fold oxygen coordination in the ideal garnet structure whereas in the garnet-like $Li_5La_3M_2O_{12}$Li occupies the highly distorted octahedral positions. The garnet-like structure has two types of $LiO_6$ octahedra; of these $Li(I)O_6$ is more distorted than $Li(II)O_6$. $MO_6$ octahedra are surrounded in a cubical manner by six $LiO_6$ octahedra and two vacant lithium positions. The vacant positions are arranged along the axes between the neighbouring $MO_6$ octahedra.

The garnet-like $Li_5La_3M_2O_{12}$ compounds have a significant lithium ion conductivity. In particular it was demonstrated on the tantalum-containing compound $Li_5La_3Ta_2O_{12}$ that volume conductivity and grain-boundary conductivity in the garnet-like structure tend to be of a comparable order of magnitude. Hence the total conductivity is extremely high and even above that of Li-β-alumina or of $Li_9AlSiO_8$ but still considerably below the conductivities of LISICON or $Li_3N$.

The object of the present invention was to provide improved solid ion conductors having a high ion conductivity, e.g., higher ion conductivity than $3.4 \times 10^{-6}$ S/cm, a low electronic conductivity and a high chemical stability. In particular the object of the invention was to provide improved lithium ion conductors.

It was found that materials having a garnet-like structure have an extremely high ionic conductivity. The novel solid ion conductors are formally derived from the already known garnet-like structures of the composition $Li_5La_3M_2O_{12}$. Surprisingly garnet-like structures having a considerably improved ion conductivity are produced from this compound by aliovalent substitution.

Aliovalent substitution is understood as the substitution of an ion by an ion of another oxidation state and the resulting charge compensation that is required can be achieved by cation vacancies, anion vacancies, interstitial cations and/or interstitial anions.

Starting with the known garnet-like structures $Li_5La_3M_2O_{12}$ the connectivity of the network can be increased and the number of available vacant positions can be varied according to the invention by aliovalent substitutions. In this connection the $La^{3+}$ positions are preferably aliovalently substituted for example by divalent cations. The charge compensation can preferably be by means of $Li^+$ cations. The conductivity of the structure can be made-to-measure by suitable doping.

Furthermore any other elements or combinations of elements can be used according to the invention instead of Li, La, M and O. It is possible to obtain any ion conductors by partial or complete formal substitution of the Li cations by other metal cations and in particular by alkali ions. The solid ion conductors according to the invention are characterized by the garnet-like structure that is described in detail above.

Hence the present invention provides a solid ion conductor having a garnet-like crystal structure which has the stoichiometric composition $$L_{5+x}A_yG_zM_2O_{12}$$

wherein

L is in each case independently an arbitrary preferably monovalent cation,

A is in each case independently a monovalent, divalent, trivalent or tetravalent cation, G is in each case independently a monovalent, divalent, trivalent or tetravalent cation M is in each case independently a trivalent, tetravalent or pentavalent cation, $0 < x \leq 3$, $0 \leq y \leq 3$, $0 \leq z \leq 3$ and wherein O can be partially or completely replaced by divalent and/or trivalent anions such as e.g. $N^{3-}$.

Within a structure of this formal composition L, A, G and M can each be the same or different.

L is particularly preferably an alkali metal ion for example $Li^+$, $Na^+$ or $K^+$. In this connection combinations of different alkali metal ions for L are also especially possible.

A represents an arbitrary monovalent, divalent, trivalent or tetravalent cation or any combinations thereof. Divalent metal cations can be preferably used for A. Alkaline earth metal cations such as Ca, Sr, Ba and/or Mg as well as divalent transition metal cations such as e.g. Zn are particularly preferred.

G represents an arbitrary divalent, trivalent, tetravalent or pentavalent cation or any combinations thereof. Trivalent metal cations can be preferably used for G. G is particularly preferably La.

M represents an arbitrary divalent, trivalent, tetravalent or pentavalent cation or any combinations thereof. Pentavalent cations can be preferably used for M. M is also preferably a transition metal, which is preferably selected from Nb and Ta. Other examples of suitable pentavalent cations are Sb and V. When selecting M it is advantageous to select transition metal ions which have a high stability towards reduction. M is most preferably Ta.

In a structure of the above composition $O^{2-}$ can be completely or partially replaced by other anions. For example it is advantageous to completely or partially replace $O^{2-}$ by other divalent anions. In addition $O^{2-}$ can also be aliovalently substituted by trivalent anions with a corresponding charge compensation.

Furthermore in the above composition $0 < x \leq 3$, preferably $0 < x \leq 2$ and particularly preferably $0 < x \leq 1$; $0 \leq y \leq 3$, and $0 \leq z \leq 3$. The stoichiometric ratio of the components is selected in such a manner that an overall uncharged garnet-like structure is present.

In a preferred embodiment of the present invention L is a monovalent cation, A is a divalent cation, G is a trivalent cation and M is a pentavalent cation. Furthermore in this preferred embodiment the stoichiometry of the compound is preferably:

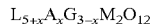

$L_{5+x}A_xG_{3-x}M_2O_{12}$ wherein x is defined as above and preferably $0 < x \leq 1$.

A specialized aspect of the present invention provides a solid lithium ion conductor of the stoichiometric composition $Li_6ALa_2M_2O_{12}$ in which A denotes a divalent metal and M denotes a pentavalent metal. Within a structure of this formal composition A and M can in each case be the same or different.

A is preferably selected from alkaline earth metals, preferably from Ca, Sr, Ba and/or Mg. A can also be preferably selected from divalent transition metals such as for example A=Zn. A is most preferably Sr or Ba.

M can be any pentavalent cation for example a metal in the oxidation state +V, M is preferably a transition metal that is preferably selected from Nb and Ta. Other examples of suitable pentavalent cations are Sb and V. When selecting M it is advantageous to select transition metal ions which have a high stability towards a reduction by elemental lithium. M is most preferably Ta.

Lithium ion conductors of the composition $Li_6ALa_2M_2O_{12}$ have a garnet-like crystal structure. Compared to the known compounds of the composition $Li_5La_3M_2O_{12}$, La was formally replaced by a divalent ion A and a lithium cation and thus the proportion of lithium in the structure was increased. As a result it is possible to use the compounds of the present invention to provide considerably improved lithium ion conductors.

Compared to the compounds of the prior art, the materials of the composition $Li_6ALa_2M_2O_{12}$ have an increased lithium conductivity. For example the lithium conductivity of $Li_6ALa_2Ta_2O_{12}$ (A=Sr, Ba) of $10^{-5}$ S/cm at 20° C. is an order of magnitude higher than that of LIPON. Due to the garnet structure of the compounds of the present invention which is a 3D-isotropic structure, the lithium ion conduction is possible in 3 dimensions without a preferred direction.

In contrast the electronic conductivity of the compounds of the present invention is negligibly small. Polycrystalline samples of the compounds of the present invention exhibit a low grain boundary resistance such that the total conductivity is due almost exclusively to the volume conductivity.

Another advantage of the materials is their high chemical stability. The materials exhibit in particular no detectable changes when heated in contact with melted lithium. At temperatures of up to 350° C. and direct voltages of up to 6 V there is no chemical decomposition.

According to another aspect the present invention concerns processes for producing the solid ion conductors having a garnet-like structure. The compounds can be formed by reacting appropriate salts and/or oxides of the elements that are contained therein for example by means of a solid phase reaction. Particularly suitable starting materials are nitrates, carbonates and hydroxides which during the course of the conversion are converted into the corresponding oxides.

In particular the present invention concerns processes for producing solid ion conductors of the composition $L_{5+x}A_xG_{3-x}M_2O_{12}$ (e.g. $Li_6ALa_2M_2O_{12}$). The materials can be obtained by reacting appropriate salts and/or oxides of A, G and M with a hydroxide, nitrate or carbonate of L in a solid phase reaction. In this case A and M are defined as above. The divalent metal A is preferably used in the form of nitrates. In this connection $Ca(NO_3)_2$, $Sr(NO_3)_2$ and $Ba(NO_3)_2$ are preferred. La is preferably used for G, which is preferably used in the form of $La_2O_3$. M is advantageously used as an oxide and $Nb_2O_5$ and $Ta_2O_5$ are preferred. L is preferably used in the faun of LOH, $LNO_3$ or $L_2CO_3$. For example $LiOH.H_2O$ can be preferably used. In order to compensate a weight loss of L (e.g. L=Li) during the heat treatment of the samples, the corresponding salt is preferably used in an excess; an excess of 10% is for example suitable.

The starting materials are mixed in a first step and can for example be ground by zirconium oxide ball-milling in 2-propanol. The mixture obtained in this manner is subsequently heated for several hours, preferably for 2-10 h in air at temperatures in the range of preferably 400-1000° C. Temperatures of ca. 700° C. and a heat treatment period of about 6 hours are particularly suitable for this. A grinding process is subsequently again carried out, preferably also by zirconium oxide ball-milling in 2-propanol. The reaction product is subsequently pressed at isostatic pressure into moulded pieces, for example into pellets. These are then preferably sintered for several hours, preferably for 10-50 h, more preferably for 20-30 h at temperatures in a range of preferably 700-1200° C., more preferably 800-1000° C. Temperatures of about 900° C. and a heat treatment period of about 24 hours are particularly suitable for this. In this sintering process it is advantageous to cover the samples with a powder of the same composition in order to avoid excessive losses of the L-hydroxide.

The solid ion conductors (e.g. lithium conductors) obtained by the production process of the present invention are a valuable starting material as solid electrolytes.

Since the materials have an unusually high ion conductivity while having a negligible electron conduction, they can be used as a solid electrolyte for batteries (e.g. lithium batteries) with a very high energy density. As a result of the high resistance of the materials towards chemical reactions e.g. with elemental lithium and towards conventional electrode materials, the solid lithium ion conductors of the present invention can for example be used practically in lithium ion batteries.

The resistance of the phase boundary between the solid electrolyte of the present invention and the electrodes is also very small compared to common electrolyte materials. As a result batteries can be produced using the materials according to the invention which have a relatively high power (high currents). The use of the solid-state electrolytes of the present invention improves safety compared to the use of liquid electrolytes. This is particularly advantageous for an application in motor vehicles.

Another aspect of the present invention concerns the use of the solid ion conductors (e.g. lithium ion conductors) in electrochromic systems (windows, screens, facades etc.) as well as for instantaneous energy storage or release in super-capacitors (supercaps). In this connection energy densities of capacitors of 100 F/cm$^3$ can be achieved by using the ion conductors according to the invention. Another aspect of the invention is the use of the garnet-like solid ion conductors as sensors for example for numerous gases.

The solid ion conductors of the present invention can be used in the form of pellets, or as thin layers in a crystalline or amorphous form.

FIGURES

The present invention is further illustrated by the following example.

EXAMPLE

Production of Pellets of $Li_6ALa_2Ta_2O_{12}$ (A=Ca, Sr, Ba)

Figure 1:
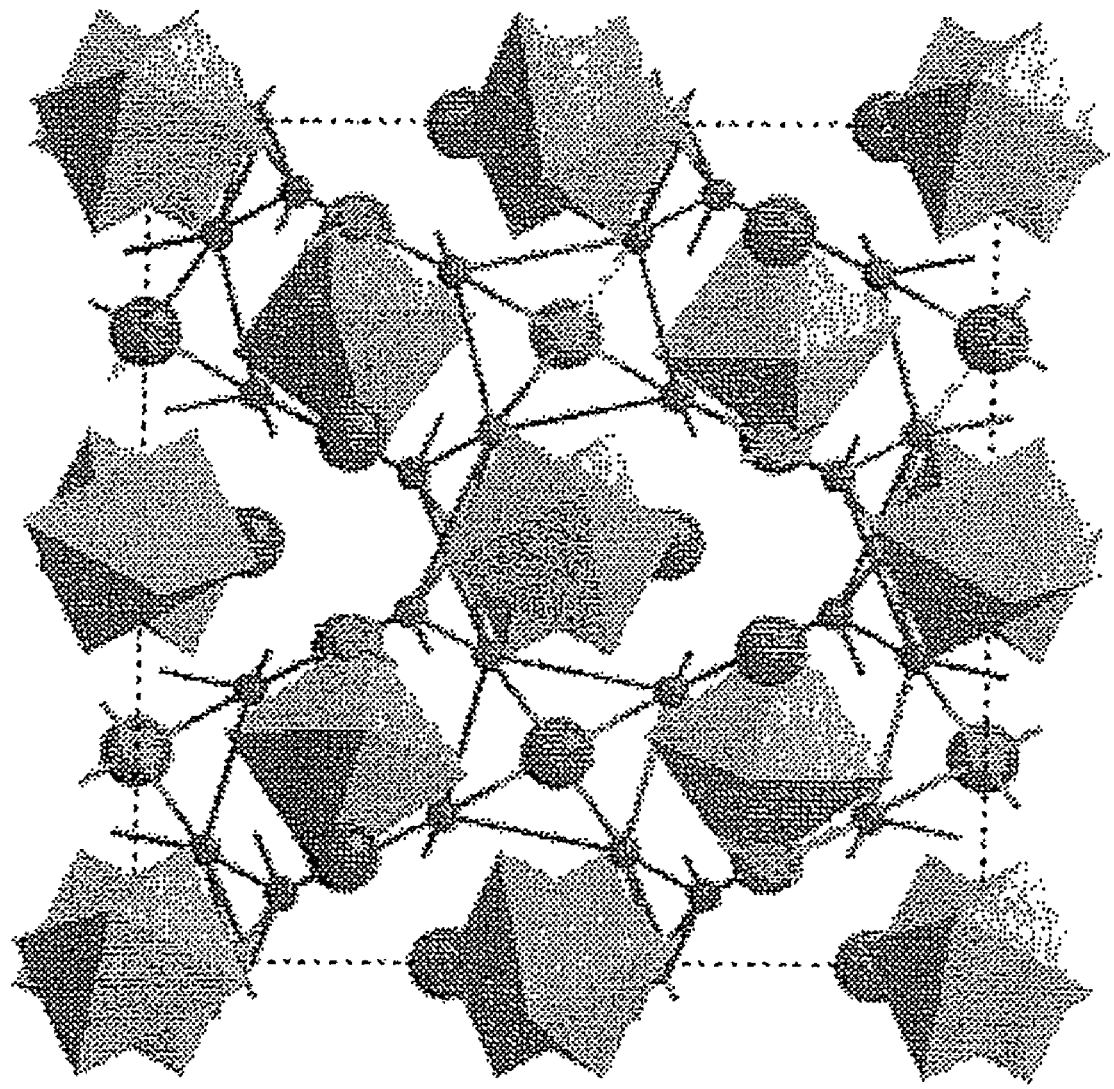
FIG. 1 shows a unit cell of the crystal structure of $Li_5La_3M_2O_{12}$ (M=Nb, Ta)
Figure 2:
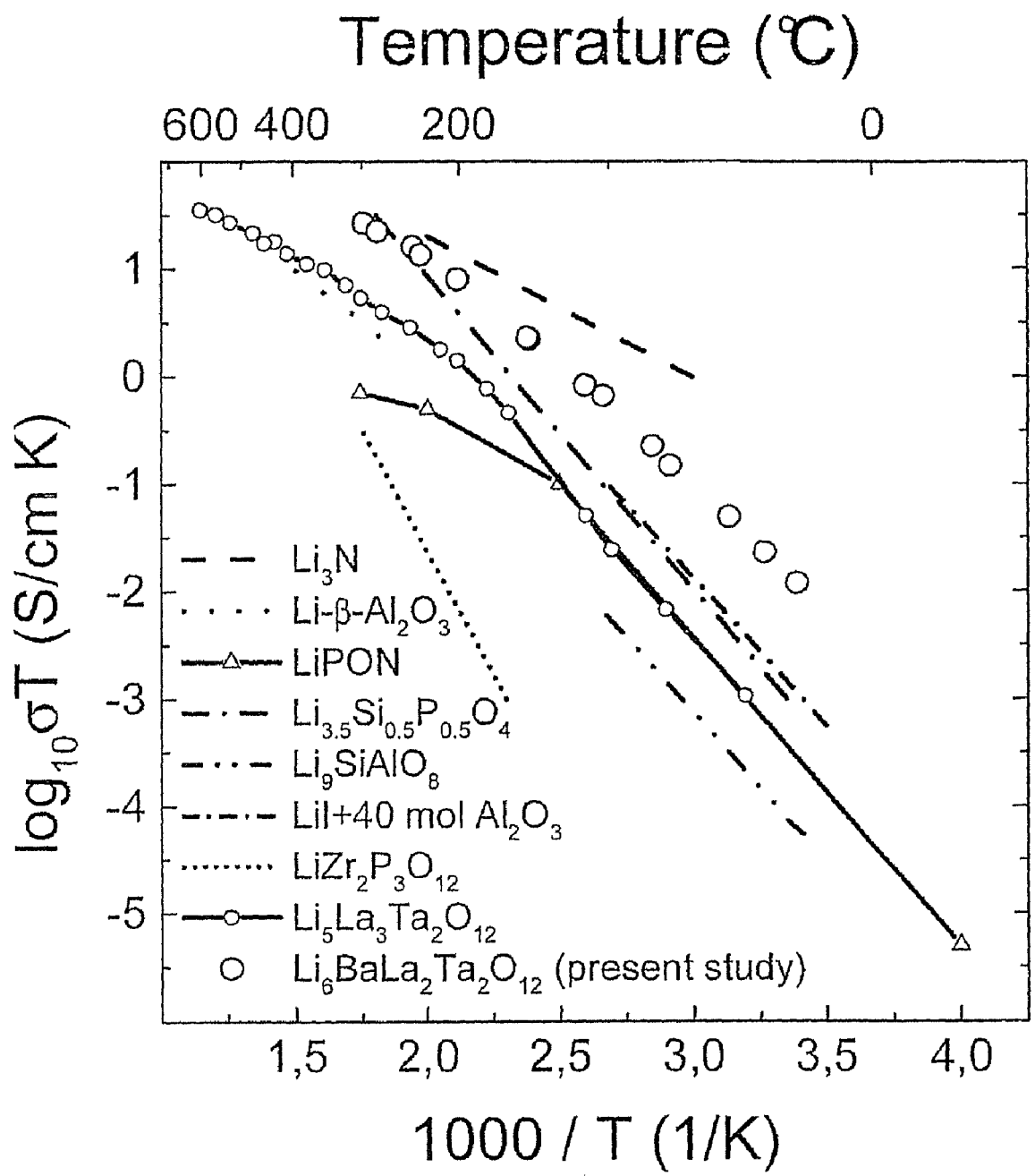
FIG. 2 shows the measured conductivity of $Li_6BaLa_2Ta_2O_{12}$ in comparison with other solid lithium ion conductors. The materials according to the invention have very high ionic conductivities that are comparable with those of $Li_{3.5}P_{0.5}Si_{0.5}O_4$ or even $Li_3N$.
Figure 3:
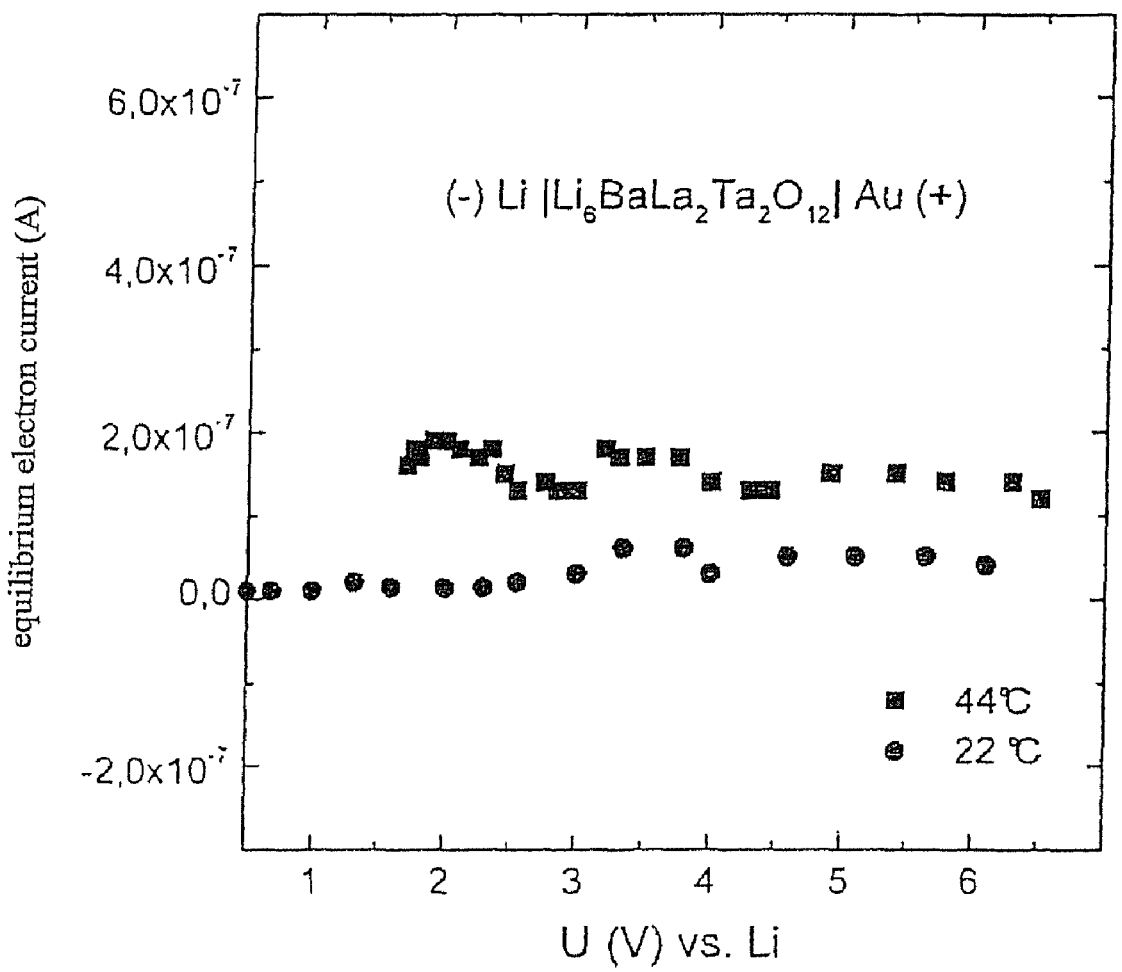
FIG. 3 shows the equilibrium electron current as a function of the applied voltage for $Li_6BaLa_2Ta_2O_{12}$ obtained at 22° C. and at 44° C. by Hebb-Wagner (HW) measurements with a lithium ion blocking electrode using lithium as a reference electrode. The measurements were carried out in a glovebox filled with argon at an oxygen partial pressure of <1 ppm.

$La_2O_3$ (predried at 900° C. for 24 h), $Nb_2O_5$ and $A(NO_3)_2$ were mixed in a stoichiometric ratio with a 10% excess of $LiOH \cdot H_2O$ and ground for 12 h in 2-propanol using zirconium balls. The mixture obtained was heated for 12 h in air to 700° C. and subsequently again ground by balls. Subsequently the mixture was pressed into pellets at isostatic pressure and covered with a powder of the same composition to avoid excessive losses of the lithium oxide. The pellets were sintered for 24 h at 900° C. Subsequently the conductivity and the chemical stability of the resulting solid lithium ion conductors was examined. The results are shown in table 1 and in FIGS. 2 and 3.

TABLE 1

Resistance of $Li_6ALa_2Ta_2O_{12}$ (A = Sr, Ba) at 22° C. in air

| Compound | $R_{vol}$ [kΩ] | $C_{vol}$ [F] | $R_{gb}$ [kΩ] | $C_{gb}$ [F] | $C_{el}$ [F] | $\sigma_{total}$ [Scm$^{-1}$] | $E_a$ [eV] |
|---|---|---|---|---|---|---|---|
| $Li_6SrLa_2Ta_2O_{12}$ | 18.83 | $3.0 \times 10^{-11}$ | 3.68 | $8.5 \times 10^{-9}$ | $5.7 \times 10^{-6}$ | $7.0 \times 10^{-6}$ | 0.50 |
| $Li_6BaLa_2Ta_2O_{12}$ | 3.45 | $1.2 \times 10^{-11}$ | 1.34 | $1.3 \times 10^{-7}$ | $1.2 \times 10^{-6}$ | $4.0 \times 10^{-5}$ | 0.40 | vol: volume
gb: grain boundaries

The invention claimed is:

1. A method of producing a battery, accumulator, supercap, fuel cell, sensor or electrochromic device having high energy density and chemical stability comprising incorporating a solid ion conductor having a garnet-like crystal structure and a higher ion conductivity than $3.4 \times 10^{-6}$ S/cm into said battery, accumulator, supercap, fuel cell, sensor or electrochromic device, wherein the solid ion conductor has a stoichiometric composition of

$L_{5+x}A_yG_zM_3O_{12}$, and wherein L is in each case independently an arbitrary preferably monovalent cation,
A is in each case independently a monovalent, divalent, trivalent or tetravalent cation,
G is in each case independently a monovalent, divalent, trivalent or tetravalent cation
M is in each case independently a trivalent, tetravalent or pentavalent cation,
$0 < x \leq 2$, $0 \leq y \leq 3$, $0 \leq z \leq 3$ and
wherein O can be partially or completely replaced by divalent and/or trivalent anions,
and wherein at least one of A and G is a divalent cation.

2. The method of claim 1, wherein said solid ion conductor is used in the form of pellets, as a thin layer, or in a crystalline or amorphous foil.

3. A method of producing a battery, accumulator, supercap, fuel cell, sensor or electrochromic device having high energy density and chemical stability comprising incorporating a solid ion conductor having a garnet-like crystal structure and a higher ion conductivity than $3.4 \times 10^{-6}$ S/cm into said battery, accumulator, supercap, fuel cell, sensor or electrochromic device, wherein said solid ion conductor has a stoichiometric composition of

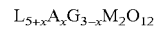
$L_{5+x}A_xG_{3-x}M_2O_{12}$ and wherein $0 < x \leq 1$,

L is a monovalent alkali metal cation,

A is a divalent metal cation,

G is a trivalent cation, and

M is a pentavalent cation.

4. The method of claim 3, wherein A is selected from Sr and Ba and wherein M is Ta.

5. The method of claim 1, wherein M is selected from transition metal ions.

6. The method of claim 1, wherein A is selected from Ca, Sr and/or Ba and wherein M is selected from Nb and Ta.

7. The method of claim 1, wherein L is selected from $Li^+$, $Na^+$, or $K^+$, which can in each case be the same or different.

8. The method of claim 7, wherein L is $Li^+$.

9. The method of claim 1, wherein said solid ion conductor is stable towards elemental lithium at lithium activities corresponding to a voltage of 5V.

10. The method of claim 3, wherein said solid ion conductor is used in the form of pellets, as a thin layer, or in a crystalline or amorphous foil.

11. The method of claim 3, wherein said solid ion conductor is stable towards elemental lithium at lithium activities corresponding to a voltage of 5V.

* * * * *